(12) United States Patent
Even et al.

(10) Patent No.: US 8,281,599 B2
(45) Date of Patent: Oct. 9, 2012

(54) DEVICE FOR DAMPING THE LATERAL FORCES DUE TO JET SEPARATION ACTING ON A ROCKET ENGINE NOZZLE

(75) Inventors: Philippe Even, Sainte Genevieve les Gasny (FR); Philippe Beauverger, Saint Just (FR); Christelle Branchet, Vernon (FR); Frédérick Millon, La Croix Saint Leufroy (FR)

(73) Assignee: SNECMA, Paris (FR)

( * ) Notice: Subject to any disclaimer, the term of this patent is extended or adjusted under 35 U.S.C. 154(b) by 981 days.

(21) Appl. No.: 12/488,952

(22) Filed: Jun. 22, 2009

(65) Prior Publication Data
US 2009/0314895 A1 Dec. 24, 2009

(30) Foreign Application Priority Data

Jun. 24, 2008 (FR) ...................................... 08 54169

(51) Int. Cl.
*F02K 9/97* (2006.01)
(52) U.S. Cl. .................. 60/770; 239/265.19; 244/171.2
(58) Field of Classification Search .................... 60/233, 60/770, 771, 228, 230; 188/371, 376, 377; 239/265.19; 244/171.2
See application file for complete search history.

(56) References Cited

U.S. PATENT DOCUMENTS

| | | | | |
|---|---|---|---|---|
| 3,361,362 A * | 1/1968 | Edwards | ................... | 239/265.35 |
| 3,537,696 A * | 11/1970 | Webster, Jr. | ................... | 267/293 |
| 3,759,351 A | 9/1973 | Purple | | |
| 4,179,944 A * | 12/1979 | Conner | ......................... | 192/141 |
| 5,607,123 A | 3/1997 | Larsen | | |
| 6,282,887 B1 | 9/2001 | Polushin et al. | | |
| 2003/0057318 A1* | 3/2003 | Struzik et al. | .............. | 244/17.27 |

FOREIGN PATENT DOCUMENTS

WO WO 01/94806 12/2001

* cited by examiner

*Primary Examiner* — Ted Kim
(74) *Attorney, Agent, or Firm* — Weingarten, Schurgin, Gagnebin & Lebovici LLP

(57) ABSTRACT

The invention relates to a device for damping the lateral forces due to jet separation that act on a rocket engine nozzle during a stage of starting or stopping the engine, the engine including at least two identical drive assemblies mounted on the nozzle to take up the lateral forces acting thereon, each drive assembly comprising a first member forming a strut, a second member forming an anchor structure, and an actuator. Each strut comprises means enabling it to act as a rigid strut so long as the lateral forces acting on the corresponding actuator remain below a determined force threshold, and as an element for peak limiting force and for dissipating residual kinetic energy once the forces acting on the actuator exceed the determined force threshold.

7 Claims, 5 Drawing Sheets

DEVICE FOR DAMPING THE LATERAL FORCES DUE TO JET SEPARATION ACTING ON A ROCKET ENGINE NOZZLE

BACKGROUND OF THE INVENTION

The present invention relates to rocket engine nozzles, and more particularly to nozzles that will be subjected to jet-separation phenomenon that gives rise to high levels of lateral force.

To obtain high specific impulse at altitude, rocket engines are fitted with nozzles having a large section ratio. For a given engine, as it rises through the atmosphere, ambient pressure decreases, dropping from atmospheric pressure at sea level to a low pressure that is a function of altitude. Nozzles are generally optimized as a function of the overall performance of the launcher, which leads to using over extended nozzles for which thrust reaches a maximum at a so-called "critical" altitude. Consequently, at the atmospheric pressure to be found at sea level, the extent to which gas can expand in the nozzle is limited by a phenomenon whereby the jet separates from the wall of the diverging portion.

This phenomenon exists throughout the stage of flight that extends from lift-off up to the critical altitude, which may be situated for example at about ten kilometers from the ground, and at which thrust reaches a maximum because the static pressure of the gas in the outlet section of the nozzle is then equal to ambient pressure, which is relatively low. Throughout this stage of flight, the static pressure of the gas in the outlet section of the nozzle is well below ambient pressure, thereby leading to the phenomenon of the jet separating within the nozzle, which phenomenon disappears at the critical altitude. The jet-separation phenomenon also occurs on the ground while the engine is being stopped.

Jet separation is particularly large during stages of starting the engine on the ground, or stopping it, where applicable. In particular, there is a risk of the lateral forces generated by jet separation breaking the attachment between the engine and the launcher, which can have consequences that are harmful or even catastrophic for the launcher and the launch base (destruction of the launch pad, etc.).

To limit the forces due to jet separation, various types of solution have already been proposed. One of these solutions consists in taking of the lateral forces acting on the diverging portion by means of mechanical drive assemblies that are distributed around the nozzle. With such assemblies, in the event of the jet separating, control actuators transmit a bearing reaction to the diverging portion in the opposite direction to the lateral force generated on the diverging portion. The energy delivered to the diverging portion by jet separation is transformed into kinetic energy of the engine tilting. If jet separation persists in amplitude and direction, the maximum stroke of the drive assembly in question is reached and it comes into abutment. On coming into abutment, elastic deformation of the drive assembly enables the kinetic energy of the engine to be dissipated as potential energy of deformation. Nevertheless, if the level of energy to be dissipated is too great, the forces on coming into abutment exceed the limits of the parts concerned, thereby causing them to break, and possibly destroying the launcher on the launch pad.

OBJECT AND SUMMARY OF THE INVENTION

The present invention seeks to remedy the above-mentioned drawbacks by proposing a device for damping the lateral forces due to jet separation, which device is completely reliable under all circumstances.

This object is achieved by a device for damping the lateral forces due to jet separation acting on a rocket engine nozzle during a stage of said engine being started or stopped, the engine having a combustion chamber in which combustion gas is generated, a nozzle connected to the combustion chamber in which a supersonic flow of combustion gas occurs, and at least two identical drive assemblies mounted on the nozzle in order to take up the lateral forces acting thereon, each drive assembly comprising:

a first member forming a strut having a first end hinged to the nozzle;

a second member forming an anchor structure with a first end hinged to the combustion chamber and a second end hinged to a second end of the strut; and an actuator having a first end for hinging to a stationary structure of the rocket and a second end hinged to the second end of the anchor structure;

wherein each strut comprises means enabling it to act as a rigid strut so long as the lateral forces acting on the corresponding actuator remain below a determined force threshold, and as an element for peak limiting force and for dissipating residual kinetic energy once the forces acting on the actuator exceed the determined force threshold.

The force threshold is determined as a function of the maximum force that can be accepted by the drive assembly, and in particular by its actuator (e.g. constituted by a hydraulic cylinder). In practice, this force threshold corresponds to a force measured at the actuator. It can thus be understood that if the forces acting on the struts of the drive assemblies are below the determined force threshold, the struts act merely as rigid connecting rods. In contrast, once the forces acting on the struts exceed the force threshold, the struts cease to act as rigid connecting rods, limiting the level of force that is transmitted to the structure, and dissipating residual kinetic energy. As a result, the device of the invention serves to limit the forces acting on the attachment between the engine and the launcher so as to avoid breaking them. This improves launcher safety and launch pad safety.

Preferably, each strut comprises a rigid element secured to both ends of the strut, an element that is longitudinally deformable under compression or extension force and that is secured to both ends of the strut, and means for separating the rigid element from at least one of the two ends of the strut once the forces acting on the nozzle exceed the determined force threshold.

Advantageously, the deformable element of the strut comprises a tube extending along a longitudinal direction of the strut and presenting a plurality of circumferential slots. Such a tube is thus suitable for being subjected to plastic deformation in extension or in compression.

In a first possible embodiment, the rigid element of the strut comprises a connecting rod having one of its ends fastened directly to the strut and having its other end fastened to the strut by means of a shear pin suitable for breaking once the forces acting on the nozzle exceed the determined force threshold so as to separate the connecting rod from at least one of the ends of the strut.

In a second possible embodiment, the rigid element of the strut comprises a tubular cover disposed around the deformable tube, the strut further comprising pyrotechnic charges distributed around the cover so as to be capable of cutting it in a transverse direction to separate the cover from at least one of the ends of the strut, said charges exploding once the forces acting on the nozzle exceed the determined force threshold.

In a third possible embodiment, the rigid element of the strut comprises at least one link column having its two ends fastened to the strut, the strut further including pyrotechnic charges distributed around each column so as to enable it to be cut in a transverse direction to separate the column from at least one of the ends of the strut, said charges exploding once the forces acting on the nozzle exceed the determined force threshold.

Advantageously, the pyrotechnic charges are triggered by a system serving to measure the level of force in the corresponding actuator and delivering an order to activate the charges when said force level exceeds the predetermined threshold.

The present invention also provides a rocket engine nozzle including a device as defined above for damping the lateral forces due to jet separation.

BRIEF DESCRIPTION OF THE DRAWINGS

Other characteristics and advantages of the present invention appear from the following description given with reference to the accompanying drawings that show embodiments having no limiting character. In the figures.

DETAILED DESCRIPTION OF EMBODIMENTS

The present invention relates to a lateral-force damper device of the type having at least two drive assemblies distributed around a rocket engine nozzle 10.

These drive assemblies are controlled mainly to steer the engine in flight for launcher control purposes, however they can also take up the forces caused by jet separation and that act on the diverging portion 12 extending a combustion chamber 14 beyond a nozzle throat 16.

Figure 1:
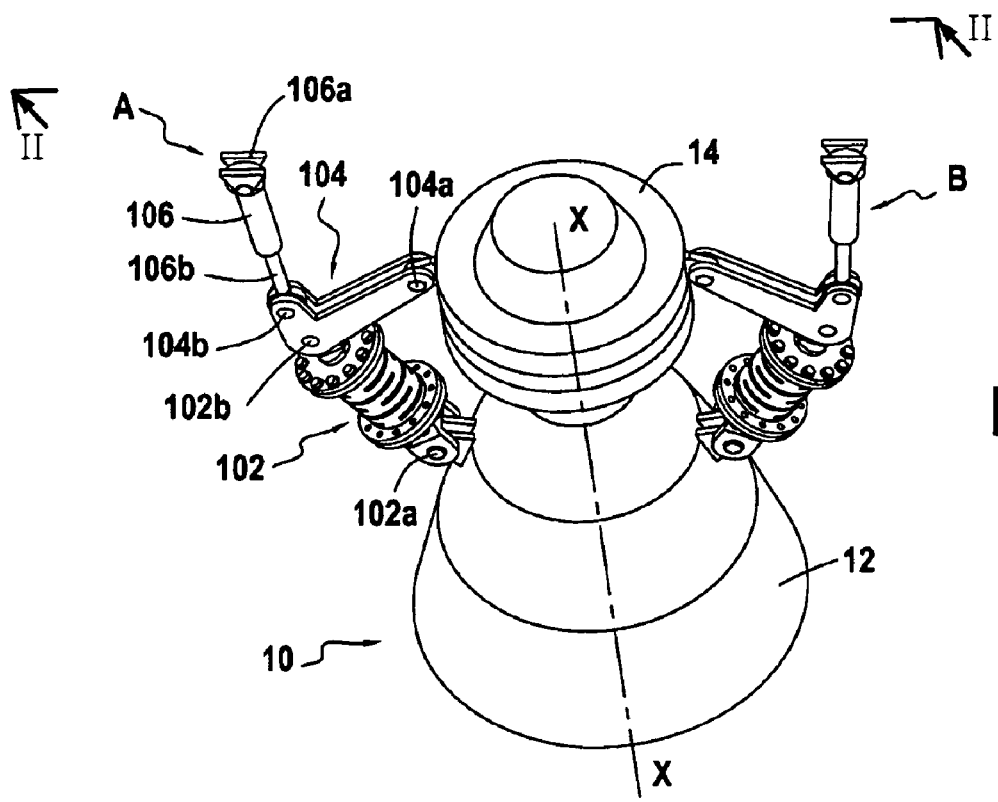
FIG. 1 is a perspective view of a rocket engine nozzle fitted with a device for damping the lateral forces due to jet separation in a first embodiment of the invention.
Figure 2:
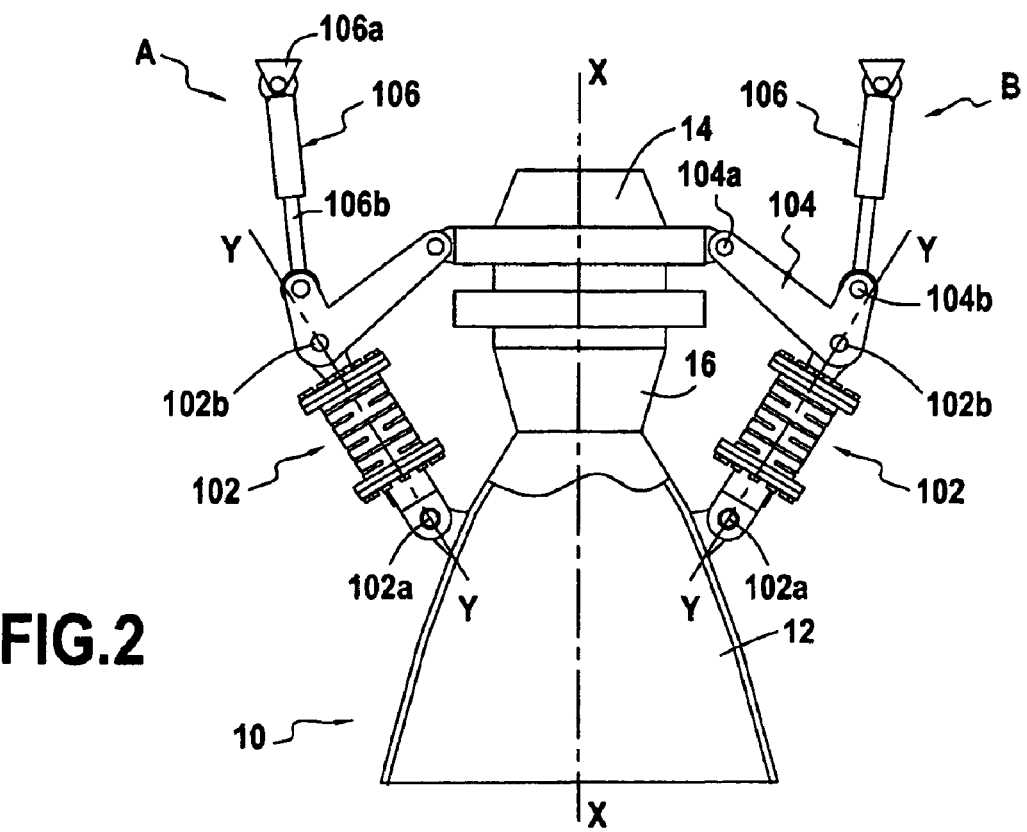
FIG. 2 is a longitudinal section view on II-II of FIG. 1.
Figure 3:
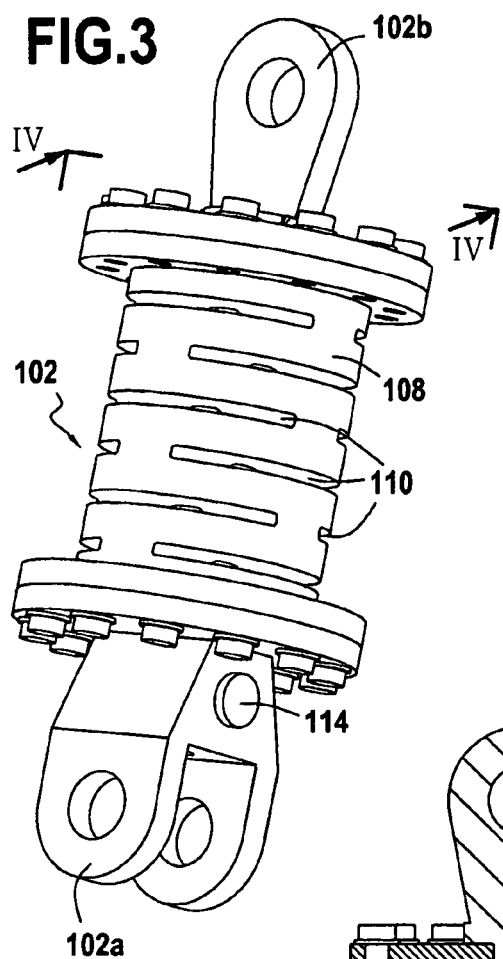
FIG. 3 is a perspective view showing a strut of the device of FIGS. 1 and 2.

With reference more particularly to the embodiment shown in FIGS. 1 and 2, there can be seen two drive assemblies A and B that are identical and mounted symmetrically about the axis X-X of the engine assembly on the nozzle 10. The two drive assemblies are thus disposed to form angles close to 180° between each other.

Each drive assembly A, B comprises a first member 102 constituting a strut with a first end 102a hinged to the diverging portion 12 of the nozzle 10, and a second member 104 forming an anchor structure with a first end 104a hinged to the combustion chamber 14 of the engine and a second end 104b hinged to a second end 102b of the corresponding strut 102. The strut 102 of each drive assembly extends longitudinally along a main axis Y-Y that is inclined relative to the axis X-X of the engine assembly.

Each drive assembly A, B, also has an actuator 106 with a first end 106a for hinging to a stationary structure of the launcher (not shown in the figures) and a second end 106b that is hinged to the second end 104b of the corresponding anchor structure 104. The actuators 106 may be constituted by various types of control actuator, for example they may be of electrical or hydraulic type.

The general principle on which the drive assemblies is operated is as follows. When a large amplitude jet-separation phenomenon appears in the nozzle during a stage of starting or stopping the engine on the ground, the pressure unbalance at the outlet from the nozzle gives rise to forces that act laterally on the diverging portion. These lateral forces comprise in particular forces acting in traction or compression on the struts 102 and then on the control actuators 106 of the drive assemblies A, B. In reaction, the control actuators act via the struts 102 to transmit force to the diverging portion in the opposite direction and of magnitude substantially equivalent to the lateral forces.

According to the invention, each strut 102 of the drive assemblies includes means enabling it to act as a rigid strut so long as the lateral forces acting on the corresponding actuator remain below a determined force threshold, and it acts as an element for limiting force peaks and for dissipating residual kinetic energy once the forces acting on the actuator exceed the determined force threshold.

Various possible embodiments of these means are described below.

In a first embodiment, shown in FIGS. 1, 2, 3, 4A, and 4B, each strut 102 of the drive assemblies comprises a tube 108 that extends longitudinally along the main axis Y-Y of the strut and that is fastened to the two ends 102a and 102b thereof.

The tube 108 presents a plurality of circumferential slots (or notches) 110. The material in which the tube is made, and the shape, distribution, and dimensioning of the slots are selected in such a manner that under a longitudinal mechanical force, the tube can be subjected to plastic deformation (i.e. it does not return the energy absorbed) in compression or in extension (like a spring). Obtaining such plastic deformation is known to the person skilled in the art and is therefore not described in detail here.

Each strut 102 also comprises a rigid connecting rod 112 that extends longitudinally along the main axis Y-Y of the strut and that has one of its ends fastened directly to (or coinciding with) one of the ends 102b of the strut and its other end fastened to the other end 102a of the strut by means of a shear pin 114. The pin is dimensioned in such a manner as to break in shear when the force acting on the strut 102 exceeds a determined force threshold, the force threshold being determined as a function of the maximum force that is acceptable by the drive assembly, and in particular by its control actuator 106.

Figure 4A:
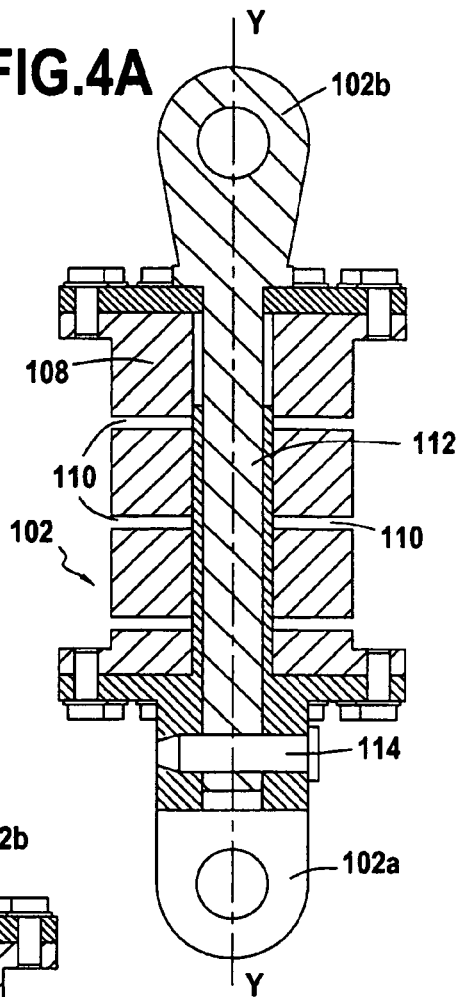
FIGS. 4A and 4B are longitudinal section views on IV-IV of FIG. 3 showing the strut in two different states.
Figure 4B:
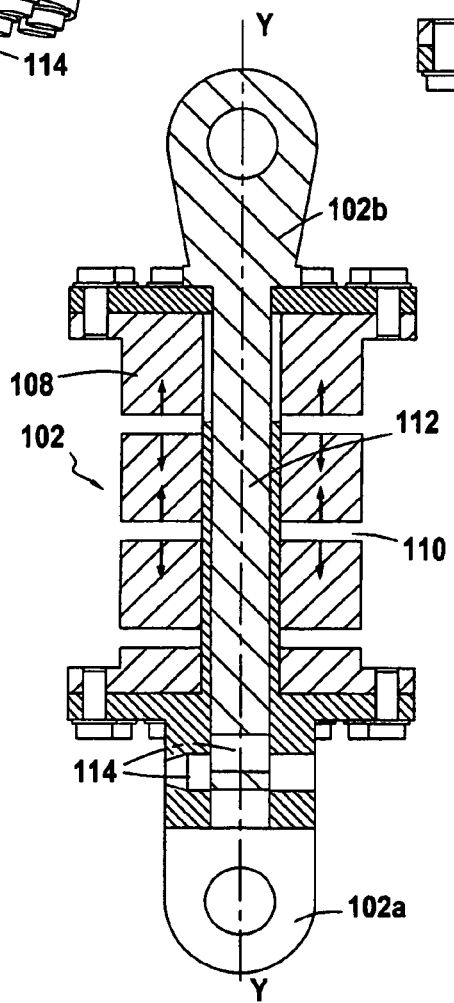

As shown more precisely in FIGS. 4A and 4B, the shear pin 114 passes through the connecting rod 112 in a transverse direction thereof, its ends being housed in corresponding recesses in the end 102a of the strut 102.

The principle of operation of the device for damping the lateral forces due to jet separation in this first embodiment is as follows. In the event of a jet-separation phenomenon occurring, each strut 10213 and thus each connecting rod 112—is subjected to traction and compression forces acting along its main axis Y-Y. So long as these forces remain below a determined threshold, the corresponding pin 114 remains intact and the device behaves like a rigid strut (FIG. 4A). If the forces exceed the determined threshold, the pin 114 breaks in shear, thereby separating the connecting rod 112 from one of the ends of the strut 102 (in the example of FIG. 4B this is the end 102a). As a result, forces are no longer transmitted between the two ends 102a and 102b of the strut by the connecting rod 112, but rather by the tube 108. Under the effect of the forces, the tube deforms in extension or compression (in the example of FIG. 4B, the tube 108 is subjected to plastic deformation in extension as represented by the arrows). The deformation of the tube 108 thus enables the forces seen by the actuator and its connections to be limited and enables the residual kinetic energy of the engine to be dissipated.

Figure 5:
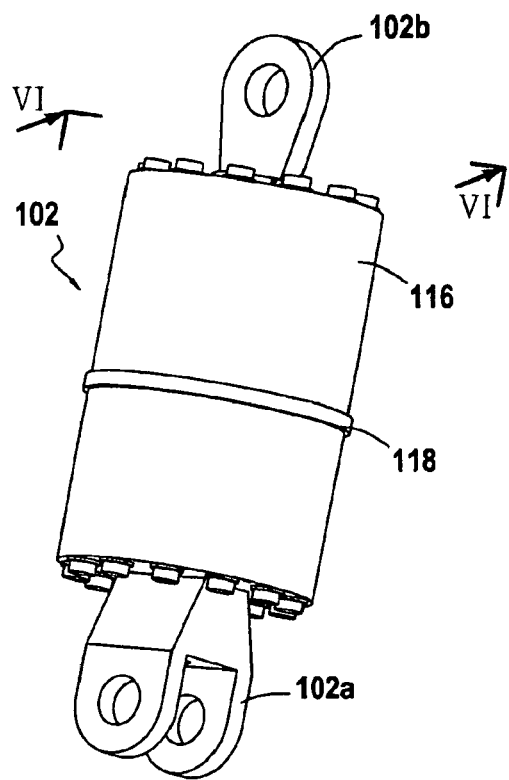
FIG. 5 is a perspective view showing a strut in a second embodiment of the invention.
Figure 6A:
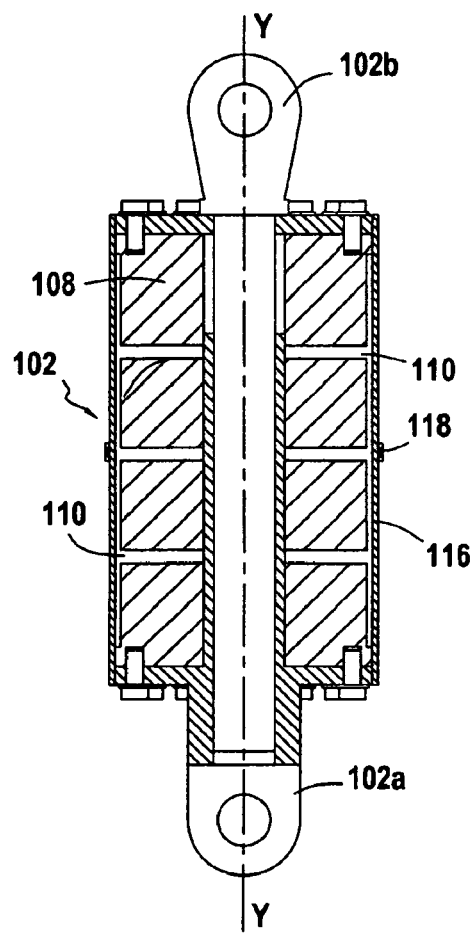
FIGS. 6A and 6B are longitudinal section views on VI-VI of FIG. 5 showing the strut in two different states.
Figure 6B:
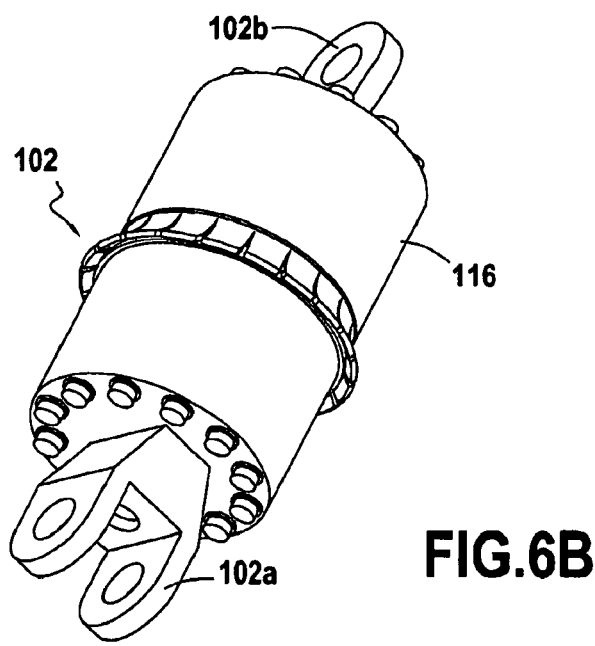

In a second embodiment shown in FIGS. 5, 6A, and 6B, each strut 102 of the drive assemblies comprises a deformable tube 108 that extends longitudinally along the main axis Y-Y of the strut and that is fastened to the two ends 102a and 102b thereof. This tube 108 is identical in shape and function to the tube described with reference to the first embodiment.

Each strut 102 also includes a tubular and rigid cover (or shell) 116 that extends longitudinally along the main axis Y-Y of the strut, that is disposed around the deformable tube 108, and that is fastened to the two ends 102a and 102b of the strut. Such a rigid cover 116 is made of a material that enables forces to be transmitted and it is fastened to the ends of the strut, e.g. by means of bolted connections, welding, etc.

Each strut 102 also includes pyrotechnic charges 118 that are incorporated in the cover 116 and that are disposed all around the main axis Y-Y. By way of example, these charges are in the form of a cord of explosive, as shown in FIGS. 5 and 6A.

The nature, the quantity, and the disposition of the pyrotechnic charges 118 are selected in such a manner that on exploding they cut right through the rigid cover 116 in the transverse direction. These criteria depend in particular on the material constituting the cover 116, on its dimensions, on its thickness, etc.

Furthermore, the pyrotechnic charges 118 explode when the force acting on the strut—and thus on the cover 116—exceeds the determined force threshold. By way of example, explosion of the charges is triggered by a system (not shown) forming part of the launcher and serving to measure the level of force in the actuator and delivering an order to activate the charges when this force level exceeds the predetermined threshold.

The principle on which this second embodiment of the jet-separation lateral force damper device operates is as follows. In the event of the jet-separation phenomenon occurring, each strut 102—and thus each rigid cover 116—is subjected to traction or compression forces that act along its main axis Y-Y. So long as these forces remain below a determined threshold, the pyrotechnic charges 118 do not explode and the device behaves like a rigid strut (FIG. 6A). If the forces exceed the determined threshold, the pyrotechnic charges 118 explode, thereby splitting the rigid cover 116 into two portions (in the example of FIG. 6B, the cutting of the rigid cover separates the two ends 102a and 102b of the strut that are then retained solely by the dissipative element 108). More precisely, exploding the pyrotechnic charges causes the cover 116 to be cut, the two portions thereof being capable of moving apart from each other (when the strut is subjected to traction force) or of overlapping as shown in FIG. 6B (when the strut is subjected to compression force). As a result, forces are no longer transmitted between the two ends 102a and 102b of the strut by the cover 116, but rather by the tube 108. Under the effect of these forces, the tube deforms in extension or compression, as explained above.

Figure 7:
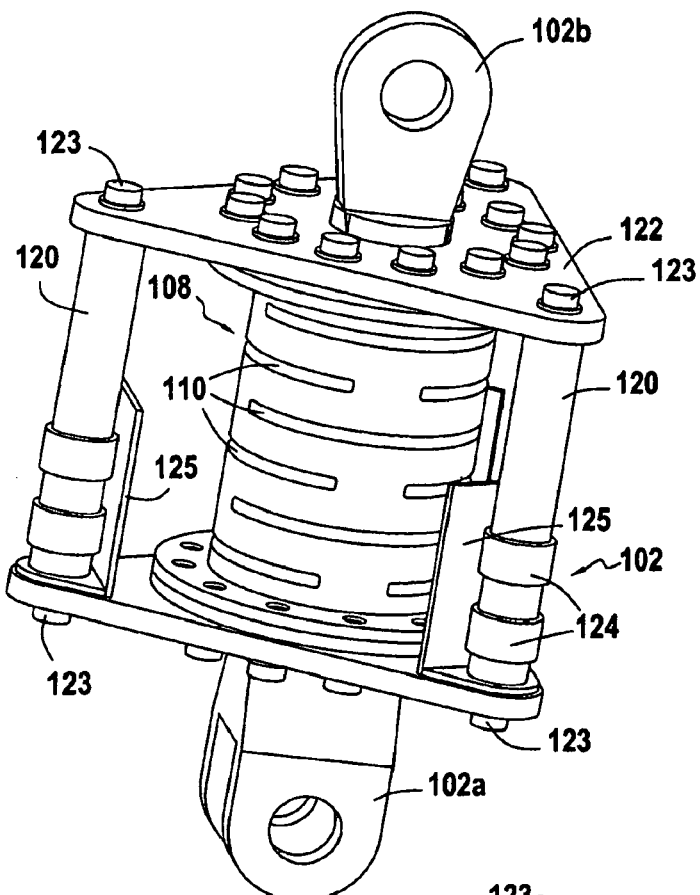
FIGS. 7 and 8 are respectively a perspective view and a side view showing a strut in a third embodiment of the invention.

In a third embodiment shown in FIGS. 6 and 7, each strut 102 of the drive assemblies comprises a deformable tube 108 that extends longitudinally along the main axis Y-Y of the strut and that is fastened to the two ends 102a and 102b of the strut. This tube 108 is identical in shape and function to that described with reference to the first embodiment.

Each strut 102 also comprises at least one rigid link column 120 that extends longitudinally along the axis Y-Y of the strut and that is fastened at its two ends to the corresponding ends 102a and 102b of the strut (for example, the link columns 120 are fastened to transverse plates 122 by means of screws 123). In the embodiment shown in FIGS. 6 and 7, the link columns 120 are three in number and they are regularly distributed around the axis Y-Y of the strut. By way of example, they are made of a material suitable for transmitting forces.

Figure 8:
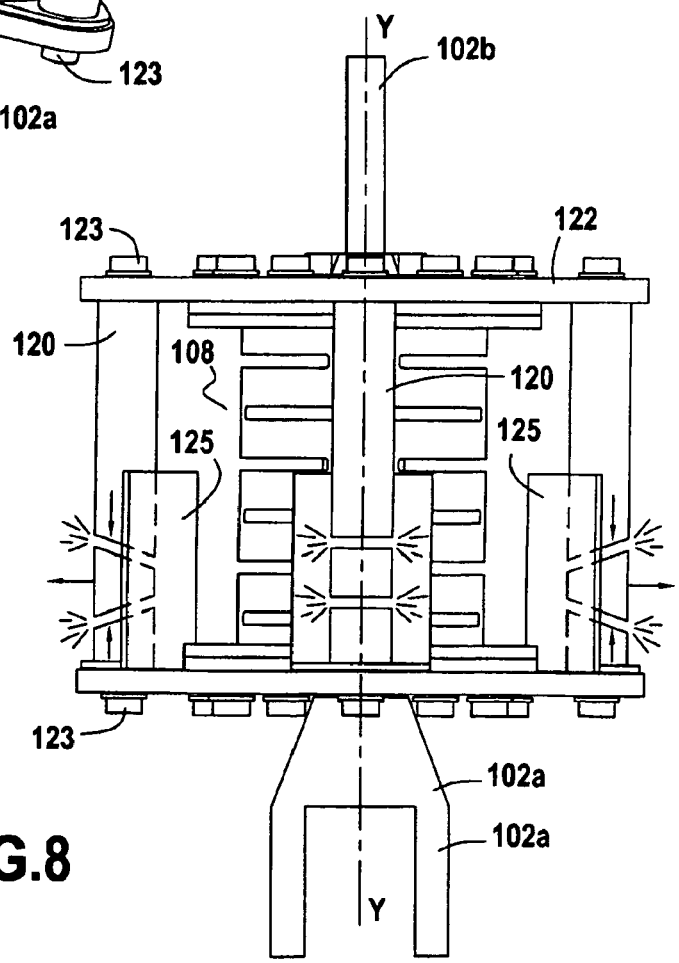

Each strut 102 also includes pyrotechnic charges 124 that are incorporated in the rigid columns 120 and that are placed around their respective longitudinal axes. By way of example, these charges 124 are in the form of two explosive cords, as shown in FIGS. 7 and 8.

The nature, the quantity, and the disposition of the pyrotechnic charges 124 are selected in such a manner that explosion thereof causes each rigid column 120 to be cut transversely. These criteria depend in particular on the material constituting the columns 120, on their dimensions, on their thickness, etc.

Furthermore, the pyrotechnic charges 124 explode when the force acting on the strut—and thus on the link columns 120—exceeds the determined force threshold. By way of example, explosion of the charges is triggered by a system forming part of the launcher and enabling the force level in the actuator to be measured, sending an order to activate the charges when the force level exceeds the predetermined threshold.

In addition, plates 125 forming deflectors may be interposed between the link columns 120 and the tube 108 in order to avoid the explosion of the pyrotechnic charges 124 damaging the tube.

The principle on which this third embodiment of the jet-separation lateral force damper device operates is as follows. In the event of the jet-separation phenomenon occurring, each strut 102—and thus each rigid link column 120—is subjected to traction or compression forces acting along its main axis Y-Y. So long as these forces remain below a determined threshold, the pyrotechnic charges 124 do not explode and the device behaves like a rigid strut (FIG. 7). If the forces exceed the determined threshold, the pyrotechnic charges 124 explode, thereby separating the link columns 120 from at least one of the ends of the strut 102 (in the example of FIG. 8, the rigid columns are separated from both ends 102a and 102b of the strut). More precisely, explosion of the pyrotechnic charges causes the link columns 120 to be cut up into several pieces. Cutting takes place in such a manner that the central pieces are expelled laterally in the event of the strut being subjected to compression (cutting takes place along sloping lines of cut as shown in FIG. 8). As a result forces are no longer transmitted between the two ends 102a and 102b of the strut by the link columns 120, but rather by the tube 108. Under the effect of the forces, the tube deforms in extension or compression, as explained above.

Figure 9:
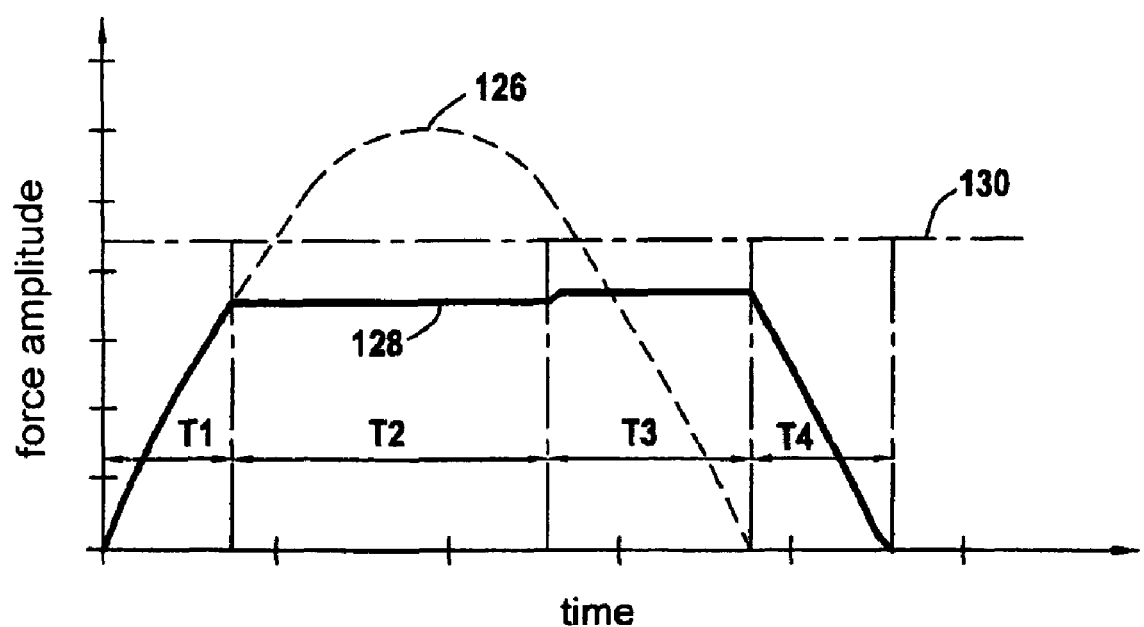
FIG. 9 is a graph plotting variation in the amplitude of the force acting on the nozzle in accordance with the invention.

With reference to FIG. 9, there follows a description of the effect obtained by using a device of the invention for damping jet-separation lateral forces.

In this figure, curve 126 plots variation as a function of time in the amplitude of the lateral forces acting on a prior art nozzle (i.e. a nozzle that does not include a device of the invention). In contrast, curve 128 shows the amplitude of the lateral forces acting on a nozzle of the invention. The horizontal line 130 represents the maximum force (or load) that can be accepted by the structure of the launcher and the actuators in the drive assemblies of the device of the invention.

Various stages are shown by these curves. In a first stage T1, the lateral force exerted by the nozzle is taken up by the actuators of the drive assemblies. In a second stage T2, beginning from a certain level of force, a device intrinsic to the actuator of the drive assembly concerned peak limits the force transmitted to the structures by allowing the engine to turn and by transforming the energy of the jet separation into kinetic energy. During this stage, the device of the invention continues to behave like a rigid strut. In a third stage T3 (if the jet separation persists in amplitude and direction), the maximum stroke of the actuator is reached and it comes into abutment. The peak limiting produced by the actuator ceases and the force transmitted to the structures starts rising again until it reaches the determined force threshold at which the pins of the struts rupture (first embodiment) or at which the pyrotechnic charges explode (second and third embodiment). During this stage, the device of the invention acts like a force peak limiter by transforming the kinetic energy into elastic deformation energy and then into plastic deformation energy. Finally, in a fourth and last stage T4, the elastic deformation energy is returned until the force drops to zero.

What is claimed is:

1. A device for damping the lateral forces due to jet separation acting on a rocket engine nozzle during a stage of said engine being started or stopped, the engine having a combustion chamber in which combustion gas is generated, a nozzle connected to the combustion chamber in which a supersonic flow of combustion gas occurs, and at least two identical drive assemblies mounted on the nozzle in order to take up the lateral forces acting thereon, each drive assembly comprising:
    a first member forming a strut having a first end hinged to the nozzle;
    a second member forming an anchor structure with a first end hinged to the combustion chamber and a second end hinged to a second end of the strut; and
    an actuator having a first end for hinging to a stationary structure of the rocket and a second end hinged to the second end of the anchor structure;
    wherein each strut comprises:
    a rigid element secured to both ends of the strut;
    an element that is longitudinally deformable under compression or extension force, secured to both ends of the strut, and comprising a tube extending in a said longitudinal direction of the strut and presenting a plurality of circumferential slots; and
    means for separating the rigid element from at least one of the two ends of the strut when the lateral forces acting on the corresponding actuator exceed a determined force threshold such that the strut acts as a rigid strut so long as the lateral forces acting on the actuator remain below the determined force threshold, and as an element for peak limiting force and for dissipating residual kinetic energy once the forces acting on the actuator exceed the determined force threshold.

2. A device according to claim 1, wherein the rigid element of the strut comprises a connecting rod having one of its ends fastened directly to the strut and having its other end fastened to the strut by means of a shear pin suitable for breaking once the forces acting on the nozzle exceed the determined force threshold so as to separate the connecting rod from at least one of the ends of the strut.

3. A device according to claim 2, wherein the shear pin passes through the connecting rod in a transverse direction thereof, the ends of the pin being housed in corresponding recesses of the strut.

4. A device according to claim 1, wherein the rigid element of the strut comprises a tubular cover disposed around the deformable tube, the strut further comprising pyrotechnic charges distributed around the cover so as to be capable of cutting it in a transverse direction to separate the cover from at least one of the ends of the strut, said charges exploding once the forces acting on the nozzle exceed the determined force threshold.

5. A device according to claim 4, wherein the pyrotechnic charges are triggered by a system serving to measure the level of force in the corresponding actuator and delivering an order to activate the charges when said force level exceeds the predetermined threshold.

6. A device according to claim 1, wherein the rigid element of the strut comprises at least one link column having its two ends fastened to the strut, the strut further including pyrotechnic charges distributed around each column so as to enable it to be cut in a transverse direction to separate the column from at least one of the ends of the strut, said charges exploding once the forces acting on the nozzle exceed the determined force threshold.

7. A rocket engine nozzle, including a device according to claim 1 for damping the lateral forces due to jet separation.

* * * * *